Aug. 8, 1944.   B. G. CARLSON   2,355,144
SELF-ALIGNING GEAR ASSEMBLY
Filed Nov. 23, 1942

INVENTOR.
BERT G. CARLSON.
BY
Frank H. Harrison
ATTORNEY.

Patented Aug. 8, 1944

2,355,144

UNITED STATES PATENT OFFICE 2,355,144

SELF-ALIGNING GEAR ASSEMBLY

Bert G. Carlson, Erieside, Ohio, assignor to Jack & Heintz, Inc., Bedford, Ohio, a corporation of Ohio Application November 23, 1942, Serial No. 466,629

2 Claims. (Cl. 74—303)

This invention relates in general to differential gear assemblies and has for one of its primary objects to provide in such a construction a self-aligning pinion or planet gear assembly that will adapt itself for adjustment and the elimination of backlash or play.

With the foregoing and other objects in view, the invention resides in the combination of parts and in the details of construction hereinafter set forth in the following specification and appended claims, certain embodiments thereof being illustrated in the accompanying drawing, in which:

Figure 1:
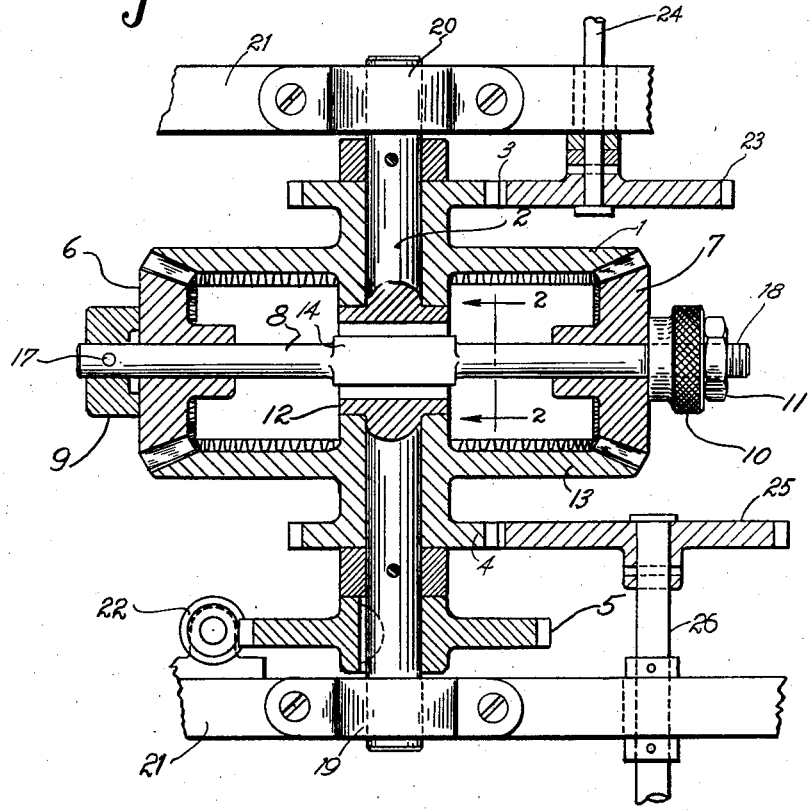
Figure 1 is a view in section taken through the differential gear assembly.
Figure 2:
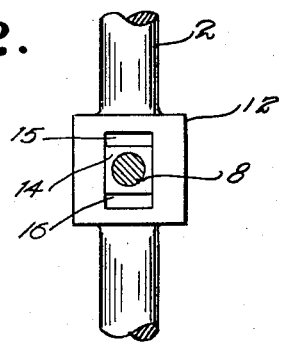
Figure 2 is a view in section taken along line 2—2 of Figure 1.

Referring more particularly to the drawing, there is shown a differential gear assembly including an axle 2 with a pair of spaced ring gears 1 and 13 rotatably mounted thereon. The axle is provided with a hub 12 having a rectangular opening therethrough to receive a strut 8 having an enlarged rectangular mid section 14 that so engages the axle hub opening as to have a sliding fit therein horizontally and a clearance 15 and 16 vertically, as viewed in Figures 1 and 2. This strut has rotatably mounted thereon a pair of pinion gears 6 and 7 adapted to mesh with the two ring gears 1 and 13. The strut has pinned thereto at 17 a retaining collar 9 to abut pinion 6. The other end of the strut is screw threaded at 18 to receive an adjustment nut 10 and a lock nut 11.

With this construction the pinion gears 6 and 7 are self-centering and self-aligning in that a turning of nut 10 in a clockwise direction adjustably draws pinion gear 6 and pinion gear 7 into proper meshed engagement with the teeth of the ring gears 1 and 13 for the prevention of undue end play. The construction, moreover, provides for the self-centering and self-alignment of the pinion gears with respect to the ring gears of the differential in that, as viewed in Figures 1 and 2, the strut 8, which when assembled acts as a shaft for the pinion gears, has its enlarged portion 14 capable of movement within the axle hub opening. Movement from side to side is prevented by the snug sliding fit. However, the clearance spaces 15 and 16 permit bodily movement of shaft 8 vertically and pivotally in one single vertical plane that is coincidental with the axis of rotation of shaft 2. Thus while the pinion gears are self-aligning and self-centering with respect to the ring gears, the toothed engagement is at all times tangential so that as end play is avoided by adjustment, backlash is also avoided.

Rotation of one ring gear, through the medium of the pinion gears brings about a corresponding rotation of the other ring gear in the opposite direction. Braking of one ring gear and a simultaneous rotation of the other ring gear causes the pinion shaft and pinion gears to be rotated about shaft 2 as an axis.

The particular illustration has to do with the separate differential gear assemblies for the aileron and elevator controls in an automatic pilot. In other words, in each case the differential is connected between the synchronizing control knob and the follow-up clutch. As illustrated, suffice it to say that shaft 2 rotates in bearings 19 and 20 secured to a base 21. Gear 5, secured to shaft 2 is driven by a worm 22, operated by a control knob (not shown). Gear 3 is fast with ring gear 1 and meshes with gear 23, carried by rotary shaft 24 which carries the follow-up clutch, not shown. Gear 4, is also fast with ring gear 13 and meshes with gear 25 carried by a rotary shaft 26. Regardless of the other functions of shafts 24 and 26, the braking of one while the other is rotating, the corresponding ring gear is braked while the other is rotated and the differential action is obtained through the pinion gears.

The importance of the provision for end play adjustment and self-centering of the pinion gears and their self-alignment with respect to the ring gear of the differential, made possible by the above described novel construction, is manifest not only for general purposes but particularly in such high precision equipment as automatic pilots where small errors of control due to end play and backlash are so readily multiplied as to be critical.

I claim:

1. In combination in a differential gear assembly, an axle and a pair of spaced ring gears rotatably mounted thereon, said axle having a central hub opening, a shaft and a pair of pinion gears rotatably mounted thereon, said pinion shaft extending through said axle hub opening with restricted clearance permitting relative movement in one plane only, said shaft being provided with an adjusting nut for adjusting the end play in the meshing relationship between said ring and pinion gears, the hub opening of said axle and that portion of said pinion shaft that engages said opening being rectangular in cross section.

2. In combination in a differential gear assembly, an axle and a pair of spaced ring gears rotatably mounted thereon, said axle having a centrally located opening in the hub thereof, a shaft and a pair of pinion gears rotatably mounted thereon, said shaft having a portion rectangular in cross section to engage said hub opening in sliding engagement in one plane and with clearance in a plane coincidental with the axis of rotation of said axle to permit relative movement between said axle and shaft in said last-named plane, said shaft being provided with means for adjusting the end play in the meshing relationship between said ring and pinion gears so as to provide for a self-centering and self-aligning relationship between said ring gears and pinion gears.

BERT G. CARLSON.